United States Patent [19]

Chalon

[11] Patent Number: 4,830,656
[45] Date of Patent: May 16, 1989

[54] CAST IRON MOLDS FOR GLASS MAKING AND METHOD OF MAKING

[75] Inventor: Jean-Claude Chalon, Blangy sur Bresle, France

[73] Assignee: Anciens Etablissements Caffier & Barreau, Blangy-sur-Bresle, France

[21] Appl. No.: 205,543

[22] Filed: Jun. 10, 1988

Related U.S. Application Data

[63] Continuation of Ser. No. 38,859, Apr. 15, 1987, abandoned.

[30] Foreign Application Priority Data

Apr. 17, 1986 [FR] France .................. 86 05545

[51] Int. Cl.$^4$ .................. C03B 9/34; B22D 27/20
[52] U.S. Cl. .................. 65/374.12; 164/58.1
[58] Field of Search .................. 65/374.11, 374.12; 164/57.1, 58.1, 59.1

[56] References Cited

U.S. PATENT DOCUMENTS

| | | | |
|---|---|---|---|
| 3,349,831 | 10/1967 | Moore et al. | 164/58.1 |
| 4,412,578 | 11/1983 | Doliwa et al. | 164/58.1 |
| 4,572,751 | 2/1986 | Oguri et al. | 164/58.1 |
| 4,579,164 | 4/1986 | Hartley et al. | 164/58.1 |

FOREIGN PATENT DOCUMENTS

| | | | |
|---|---|---|---|
| 67500 | 12/1982 | European Pat. Off. | 164/58.1 |
| 749550 | 7/1980 | U.S.S.R. | 164/57.1 |
| 2157321 | 10/1985 | United Kingdom | 164/57.1 |

Primary Examiner—Richard K. Seidel
Attorney, Agent, or Firm—Shenier & O'Connor

[57] ABSTRACT

A new material in the form of a cast iron casting, said material having a certain thickness of nodular cast iron at and in the vicinity of at least one of its outside surfaces, while the remainder of said casting has a cast iron structure which is at least partially vermicular. Said material may be obtained by casting a suitable melt into a mold containing a chiller type wall. The resulting castings are particularly suitable for constituting molds for glass making.

10 Claims, 1 Drawing Sheet

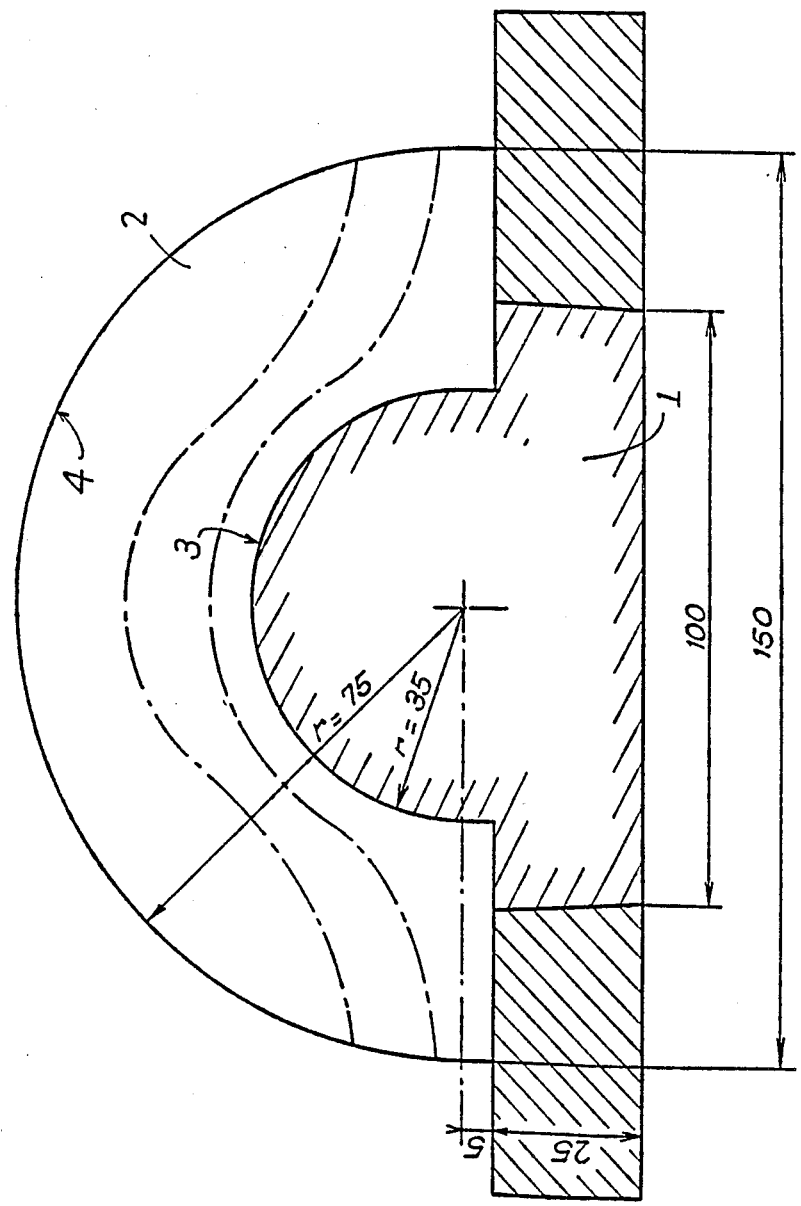

CAST IRON MOLDS FOR GLASS MAKING AND METHOD OF MAKING

This is a continuation of co-pending application Ser. No. 038,859 filed on Apr. 15, 1987, now abandoned.

The present invention relates to cast iron parts having a structure which varies through the thickness of the parts, said parts being, in particular, molds for glass making.

BACKGROUND OF THE INVENTION

There are two large families of cast irons (alloys of iron and carbon) currently in use which differ in the appearance of the graphite particles which they contain. These families are called "flake" cast irons and "nodular" cast irons, where nodular cast irons include spheroidal cast irons as an extreme case and exclude malleable cast irons. The properties of cast irons in each of these families are well known.

Methods have recently been described for preparing cast irons which appear to be intermediate between these two types of cast iron. These new cast irons would appear to constitute a third family referred to as "vermicular" graphite cast iron or "compact vermicular" graphite cast iron by virtue of the carbon concretions disposed in the iron matrix having the appearance of small spheres which have been deformed to a greater or lesser extent into worm-like shapes.

However, although the conditions which lead to the formation of such vermicular cast irons have been known in the past, they do not appear to have found any notable industrial applications because it is difficult to obtain castings of such cast irons having a structure which is organized and reproducible.

So-called "vermicular" cast irons when used in industrial fabrication processes have a structure, both on the surface of the casting and in the bulk thereof, in which the graphite is presented in the form of a mixture of worms and nodules or of worms and flakes, or of all three together, in unstable proportions which are difficult to reproduce. This explains why they are difficult to use and why they have, heretofore, been unwanted in industrial applications.

This unreproducibility comes from the fact that when attempts are made to use such vermicular cast irons in industrial methods, they always have an unreproducible and uncontrollable proportion of nodular cast iron. The resulting industrial castings therefore have a structure both on their surface and in their bulk which cannot be controlled and which it is difficult even to reproduce.

That is why the person skilled in the art has generally considered that using vermicular cast iron industrially is very difficult and that the appearance of vermicular type cast iron in a cast iron part is an undesirable phenomenon.

SUMMARY OF THE INVENTION

The present invention provides a new material in the form of a cast iron casting, said material having a certain thickness of nodular cast iron at and in the vicinity of at least one of its outside surfaces, while the remainder of said casting has a cast iron structure which is at least partially vermicular. The nodular cast iron is preferably spheroidal or at least partially spheroidal.

The invention thus relates to cast iron parts having one or more surfaces which are partially or totally constituted by nodular cast iron, with the remainder of the part in its bulk and on its other surfaces being totally or nearly totally constituted by vermicular cast iron.

As mentioned above, the "nodular" portion of the cast iron part may comprise, generally on its surface, a portion of spheroidal cast iron. It has been proved that the existence of this spheroidal cast iron (i.e., more precisely, nodular cast iron comprising at least 90% spheroidal cast iron) makes it possible to obtain better results. The presence of the nodular cast iron, and more particularly the presence of spheroidal cast iron, over a portion of the surface of the part provides the full benefit on said surface of the advantageous properties on nodular (or spheroidal) cast iron, in particular relating to its aptitude for polishing and its aptitude for welding and for metallization. The thickness of the cast iron which is totally nodular or spheroidal in structure may lie between about 5 mm to about 25 mm, depending on casting conditions.

It is essential to observe that by virtue of at least one of the working surfaces of castings in accordance with the invention having a layer of nodular cast iron, a thoroughly organized and controllable structure is obtained on said working portion. As a result, the major drawback encountered heretofore in the industrial utilization of vermicular cast irons, namely the quasi-impossibility of reproducing a given structure, can easily be overcome by local transformation (at the surface) of said vermicular cast irons into nodular cast irons, and preferably into spheroidal type cast irons.

Beyond this surface layer of nodular structure cast iron, and going towards the interior of the material, it is observed that the structure of the cast iron changes and evolves towards a vermicular structure. Under the microscope, this appears as a progressive deformation of the graphite nodules which pass from a spherical shape (characteristic of spheroidal structure) or from a substantially oval shape (characteristic of nodular structure) to a shape which is more or less elongate or worm-like which is the characteristic of vermicular structure. When the thickness of the material is relatively thin, the cast iron cannot become totally vermicular, but once the material is of adequate thickness (e.g. 30 mm to 40 mm) the presence of a totally or quasi-totally vermicular cast iron is observed in the vicinity of the surface of said material which is furthest from the face of nodular cast iron.

The present invention also provides a method of preparing such a cast iron material, wherein molten iron containing suitable quantities of known catalysts and additives for giving rise to spheroidal and to vermicular cast irons is cast into a mold including at least one wall portion which is of the chiller type.

Such known catalysts and additives are based, for example, on ferro-silico-magnesium (apparently for the purpose of nucleation) and on titanium (apparently for the purpose of opposing the effects of said nuclei). It should be observed that other catalysts and additives may also trigger the required nucleation, in particular the use of appropriate quantities of cerium and of rare earths.

The term "chiller type" wall is used to designate a wall constituted by a heat conducting material, thereby allowing the heat contained in the iron as cast to be removed. Thus, in accordance with the invention a wall of sand (as is generally used for making molds which are to receive cast iron) may be replaced by a wall of cast iron so that on contact with said wall, the casting obtained after unmolding has a layer of "nodular and spheroidal" cast iron in its portion which came into contact with or was close to the chiller wall, and has a structure which becomes more and more vermicular in its portions which are further and further from the chiller wall, which is the characteristic of the invention. Naturally, the said chiller type wall may constitute one or more of the walls of the foundry mold (or portions only of said walls).

In order to obtain a casting of reproducible structure, action may be taken on the removal of heat from the molten iron through the chiller type wall, for example by ensuring that there is a certain ratio between the mass of the chiller and the mass of the casting, while simultaneously adjusting the quantities of the catalysts and additives for encouraging nucleation.

It may be observed that U.S. Pat. No. 3,349,831 describes composite cast irons and castings based on said cast irons which are close to those of the present invention. An essential difference between the description of said U.S. patent and the description of the present invention lies in the cast iron used in said U.S. patent being a cast iron of the flake type containing various agents for giving rise locally to a nodular type of cast iron, whereas in the present application a vermicular type of cast iron is used containing agents which give rise, locally, to a nodular type of cast iron. This difference is important, since if a flake cast iron is used as described in the U.S. patent, a layer of dense graphite (layer 12) forms locally as described in said patent and constitutes a barrier which greatly modifies the properties of the castings obtained in an undesirable manner.

Castings in accordance with the present invention have a wide variety of applications, in particular all those where it is desired to obtain both the advantageous properties of vermicular cast iron which constitutes the bulk of the casting (and in particular its thermal conductivity) with the specific properties of the nodular or preferably spheroidal surface cast iron (hardness, traction strength, % elongation, elastic limit, suitability for welding and for metallization, ease of polishing, and ease of engraving for forming complicated shapes.

It has been found that molds for glass making constitute, in the current state of knowledge, the preferred application for castings whose material has the above-described structure. The invention therefore also provides new molds for glass making, made of the above-defined new material, and in which said nodular cast iron forms that portion of said molds which is to come into contact with molten glass.

It is known that such molds for glass making (used in the manufacture of bottles and various other glass objects) are subjected to numerous mechanical and thermal stresses and must also have a finely machinable and polishable surface (the surface which will be in contact with the molten glass), and must be capable of being welded to other metals. It has been found that by virtue of its specific properties, the material having variable cast iron structure is a good candidate for satisfying the above requirements and that, in accordance with the invention, it can improve the efficiency of the operation of making molded parts out of glass by improving heat exchange through the thickness of the mold and by increasing the lifetime of the mold.

In practice, the use of variable structure cast irons in accordance with the present invention for making molds for glass making provides considerable advantages (because such cast irons enable heat to be removed more rapidly than spheroidal cast irons and have improved mechanical properties over flake cast irons).

The following advantages may be mentioned in particular:
improved overall efficiency in the operation of molding parts made of glass, either by obtaining better behavior in given molding time or else by enabling the molding throughput to be increased since hotter glass can be inserted into the mold, other factors being equal;
a reduced risk of deformation and reduced cracking by making the mold operate at higher temperature gradients; and
improved resistance of the mold surfaces to contact with hot glass (which also gives rise to a reduction in cracking on the inside surface of the mold) by virtue of improved resistance to thermal shock, finer accuracy in reproducing markings in relief on the working surface of the mold on the outside surface of the molded glass, and also an improved polish of the working surface of the mold enabling a brighter surface finish on the glass.

BRIEF DESCRIPTION OF THE DRAWING

An implementation of the invention is described by way of example with reference to the sole FIGURE of the accompanying drawing which is a diagrammatic cross section through a mold including a chiller type wall for making a casting in accordance with the invention, said casting constituting in turn a portion of a mold for use in glass making.

MORE DETAILED DESCRIPTION

A mold for glass making is made as shown in the cross-section of FIG. 1. The mold is made by casting molten iron into a sand box including a metal insert which is used as a chiller element. The cast iron used may have the following composition, for example, with the numbers indicating percents by weight:

| | |
|---|---|
| carbon | 3.40–3.80 |
| silicon | 1.80–2.50 |
| manganese | 0.05–0.80 |
| sulphur | 0.002–0.02 |
| phosphorous | 0.0025–0.30 |
| nickel | 0.10–2 |
| titanium | 0.05–0.20 (with or without) |
| magnesium | 0.015–0.050 |
| cerium | PPM |
| rare earths | PPM |
| with the residue being iron | |

The chiller (I) has a radius r of 35 mm, and the casting (2) has a radius R of 75 mm. The weight of the finished casting is 12 kg, and a chiller was used weighing 4 kg. The mold for glass making obtained after unmolding has a cast iron structure which is practically entirely spheroidal on its surface (3) which was in contact with the chiller and has a structure which is 90% vermicular in the vicinity of its surface (4).

I claim:
1. A mold for glass making comprising a cast iron casting prepared from a known composition for producing a vermicular type cast iron in normal molding conditions, said casting having a thickness of between about 5 mm and about 25 mm of nodular cast iron at and in the vicinity of at least one of its outside surfaces, while the remainder of said casting has a cast iron structure which is at least partially vermicular.

2. A mold according to claim 1, wherein the thickness of said nodular cast iron lies in the range 5 mm to 25 mm.

3. A mold according to claim 2 wherein said nodular cast iron forms that portion of said mold which is to come into contact with molten glass.

4. A mold according to claim 1 wherein said nodular cast iron forms that portion of said mold which is to come into contact with molten glass.

5. A method of preparing a mold for glass making comprising a cast iron casting prepared from a known composition for producing a vermicular type cast iron in normal molding conditions, said casting having a thickness of between about 5 mm and about 25 mm of nodular cast iron at and in the vicinity of at least one of its outside surfaces, while the remainder of said casting has a cast iron structure which is at least partially vermicular including the step of casting molten iron of said known composition containing suitable quantities of known catalysts and additives for giving rise to spheroidal and to vermicular cast irons into a mold including at least one wall portion which is of the chiller type.

6. A method for preparing a mold according to claim 3 wherein the thickness of said nodular cast iron lies in the range 5 mm to 25 mm.

7. A method of forming a mold for glass making comprising the steps of:
preparing molten iron comprising of 3.40 to 3.80 percent by weight of carbon, 1.80 to 2.50 percent by weight of silicon, 0.05 to 0.80 percent by weight of manganese, 0.002 to 0.02 percent by weight of sulphur, 0.0025 to 0.30 percent by weight of phosphorous, 0.10 to 2 percent by weight of nickel, 0.015 to 0.050 percent by weight of magnesium, trace amounts of cerium and the rare earths, and the remainder iron;
casting said molten iron into a mold box having a chiller element to produce a mold having a cast iron structure which is principally spheroidal in the region adjacent its surface which is in contact with the chiller element and which is principally vermicular in the region adjacent its surface which is remote from said chiller element.

8. A method as in claim 7 in which said mold box is a sand box and said chiller element is a metal insert.

9. A method as in claim 7 in which said molten iron has 0.05 to 0.20 percent by weight of titanium.

10. A mold made in accordance with the method of claim 7.

* * * * *

UNITED STATES PATENT AND TRADEMARK OFFICE
CERTIFICATE OF CORRECTION

PATENT NO.   : 4,830,656
DATED        : May 16, 1989
INVENTOR(S)  : Jean-Claude Chalon It is certified that error appears in the above-identified patent and that said Letters Patent is hereby corrected as shown below:

Column 5, line 23 - "for" should read -- of --.

Column 5, line 24 - "3" should read -- 5 --.

Signed and Sealed this

Fifth Day of December, 1989

Attest:

JEFFREY M. SAMUELS

Attesting Officer       Acting Commissioner of Patents and Trademarks